(12) United States Patent
Xiao

(10) Patent No.: US 11,874,898 B2
(45) Date of Patent: Jan. 16, 2024

(54) STREAMING-BASED ARTIFICIAL INTELLIGENCE CONVOLUTION PROCESSING METHOD AND APPARATUS, READABLE STORAGE MEDIUM AND TERMINAL

(71) Applicant: Shenzhen Corerain Technologies Co., Ltd., Shenzhen (CN)

(72) Inventor: Mengqiu Xiao, Shenzhen (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 854 days.

(21) Appl. No.: 16/929,819

(22) Filed: Jul. 15, 2020

(65) Prior Publication Data

US 2020/0349433 A1 Nov. 5, 2020

Related U.S. Application Data

(63) Continuation-in-part of application No. PCT/CN2018/072665, filed on Jan. 15, 2018, and a continuation-in-part of application No. PCT/CN2018/072663, filed on Jan. 15, 2018.

(51) Int. Cl.
*G06F 17/16* (2006.01)
*G06N 3/08* (2023.01)
*G06F 18/25* (2023.01)
*G06F 17/15* (2006.01)

(52) U.S. Cl.
CPC ............ *G06F 17/16* (2013.01); *G06F 17/15* (2013.01); *G06F 18/251* (2023.01); *G06N 3/08* (2013.01)

(58) Field of Classification Search
CPC .......... G06F 17/16; G06F 17/15; G06N 3/045

USPC ........................................................ 708/250
See application file for complete search history.

(56) References Cited

U.S. PATENT DOCUMENTS

2009/0132794 A1 5/2009 Ebert et al.
2016/0328644 A1 11/2016 Lin et al.

FOREIGN PATENT DOCUMENTS

| CN | 1279448 | 1/2001 |
| CN | 2919379 | 7/2007 |
| CN | 102446160 | 5/2012 |
| CN | 106228238 | 12/2016 |
| CN | 106228240 | 12/2016 |
| CN | 106530210 | 3/2017 |

(Continued)

OTHER PUBLICATIONS

Machine Translation CN106875012A Jun. 20, 2017. (Year: 2017).*

(Continued)

*Primary Examiner* — Tan V Mai

(57) ABSTRACT

Provided is a streaming-based artificial intelligence convolution processing method, applied to a processing module. The method includes: adding invalid data to a starting point of a first to-be-processed data matrix stored in a first streaming lake to form a second to-be-processed data matrix, where a number of columns of the second to-be-processed data matrix is an integral multiple of a degree of parallelism of data transmission; using a data transmission module to take out the second to-be-processed data matrix from the first streaming lake in a preset manner for a convolution operation. Also provided are a streaming-based artificial intelligence convolution processing apparatus, a readable storage medium and a terminal.

17 Claims, 4 Drawing Sheets

(56) References Cited

FOREIGN PATENT DOCUMENTS

| CN | 106845635 | 6/2017 | | |
|----|-----------|--------|---|---|
| CN | 106875012 | 6/2017 | | |
| CN | 106909970 | 6/2017 | | |
| CN | 106951395 | 7/2017 | | |
| CN | 106970896 | 7/2017 | | |
| CN | 107451654 | 12/2017 | | |
| WO | WO-2020250236 A1 * | 12/2020 | ............. | G06N 20/00 |

OTHER PUBLICATIONS

Office Action in related CN201880002147.0 dated Apr. 30, 2021.
Office Action in related CN201880002151.7 dated Apr. 30, 2021.
International Search Report for PTC/CN2018/072663 dated Sep. 4, 2018.
International Search Report for PTC/CN2018/072665 dated Oct. 12, 2018.

* cited by examiner

STREAMING-BASED ARTIFICIAL INTELLIGENCE CONVOLUTION PROCESSING METHOD AND APPARATUS, READABLE STORAGE MEDIUM AND TERMINAL

CROSS-REFERENCE TO RELATED APPLICATIONS

This application is a continuation-in-part of International Applications PCT/CN2018/072663 and PCT/CN2018/072665, filed on Jan. 15, 2018, contents of both of which are incorporated herein by reference in their entireties.

TECHNICAL FIELD

The present disclosure relates to the field of artificial intelligence and, particularly, to a streaming-based artificial intelligence convolution processing method and apparatus, a readable storage medium and a terminal.

BACKGROUND

Artificial intelligence, also called AI for short, is a new technical science for researching and developing theories, methods, technologies and application systems for simulating, extending and expanding human intelligence.

An artificial intelligence algorithm is a neural network model algorithm, which simulates a human brain, and has a large amount of calculation. AlphaGo, which uses the artificial intelligence algorithm, needs thousands of traditional processors (CPU) and hundreds of graphic processors (GPU); obviously, in the coming of a new wave of artificial intelligence, the traditional processor is becoming a bottleneck of hindering the popularization of artificial intelligence.

However, a pipeline implementation degree and degree of parallelism of the current artificial intelligence algorithm is not enough, and how to implement a high-level pipeline and high degree of parallelism becomes a key technology in the technical field of artificial intelligence.

SUMMARY

In view of the above disadvantages in the related art, an object of the present disclosure is to provide a streaming-based artificial intelligence convolution processing method and an artificial intelligence convolution processing apparatus.

In order to implement the above object and other related objects, the present disclosure provides a streaming-based artificial intelligence convolution processing method applied to a processing module. The method includes steps described below. Invalid data is added to a starting point of a first to-be-processed data matrix stored in a first streaming lake to form a second to-be-processed data matrix, where a number of columns of the second to-be-processed data matrix is an integral multiple of a degree of parallelism of data transmission; a data transmission module is used to take out the second to-be-processed data matrix from the first streaming lake to a convolution module in a preset manner for a convolution operation.

In an embodiment of the present disclosure, the degree of parallelism of data transmission is set to be pv, and the step in which the plurality of columns of invalid data is added to the starting point of the first to-be-processed data matrix stored in the first streaming lake to form the second to-be-processed data matrix specifically includes a step described below. (pv−2) columns of invalid data are added to the starting point of the first to-be-processed data matrix to form pv columns of data with first two columns of valid data of the first to-be-processed data matrix.

In an embodiment of the present disclosure, the step in which the data transmission module is used to take out the second to-be-processed data matrix from the first streaming lake to the convolution module in the preset manner for the convolution operation includes steps described below. According to rows and a data size of pv*l, the data transmission module takes out the second to-be-processed data matrix from the first streaming lake and places into a second streaming lake in batches; according to rows and a data size of pv*k, the data transmission module takes out the second to-be-processed data matrix from the second streaming lake and places into a matrix module in batches for data combination; according to a data size of pv*k*k, the data transmission module to takes out the second to-be-processed data matrix after the data combination and places into the convolution module, where k is a size of a convolution kernel matrix.

In an embodiment of the present disclosure, according to the rows and the data size of pv*k, the step in which the data transmission module takes out the second to-be-processed data matrix from the second streaming lake and places into the matrix module in batches for data combination specifically includes steps described below. Each k rows of second to-be-processed data matrices is taken to be a group of data; the data transmission module sequentially performs a following operation on each group of data: in each clock cycle, sequentially taking out a third to-be-processed data matrix with the data size of pv*k from the each group of data and placing into the matrix module until the each group of data is taken out entirely.

In an embodiment of the present disclosure, in the each group of data, a first third to-be-processed data matrix taken out by the data transmission module includes (pv−2) columns of invalid data and 2 columns of valid data, so that a calculation result value of the first third to-be-processed data matrix is an invalid value; and starting from a second third to-be-processed data matrix taken out by the data transmission module, each third to-be-processed data matrix and last 2 columns of a previous third to-be-processed data matrix are combined to form a k*(pv+2) order fourth to-be-processed data matrix, each k*(pv+2) order fourth to-be-processed data matrix can perform matrix extraction according to a step length of 1 to obtain a number pv of k*k order fifth to-be-processed data matrices, and the k*k order fifth to-be-processed data matrices are transmitted to a convolution module for convolution calculation with the convolution kernel matrix.

In an embodiment of the present disclosure, the first streaming lake stores a plurality of first to-be-processed data matrices, each of the first to-be-processed data matrices corresponds to one channel data of multi-channel data, wherein the convolution module includes a plurality of convolution kernel matrices.

In an embodiment of the present disclosure, the plurality of convolution kernel matrices comprises a plurality of weight matrices with different weights, and the plurality of weight matrices is used for separately performing a convolution operation with the third to-be-processed data matrix at the same time.

In an embodiment of the present disclosure, according to a data size of 1*1, the data transmission module takes out the first to-be-processed data matrix from an external storage module and place into the first streaming lake.

In order to implement the above object and other related objects, the present disclosure provides an artificial intelligence convolution processing apparatus. The apparatus includes a first streaming lake, a processing module and a data transmission module. The first streaming lake stores a first to-be-processed data matrix; the processing module is configured to add columns of invalid data to a starting point of a first to-be-processed data matrix to form a second to-be-processed data matrix, where a number of columns of the second to-be-processed data matrix is an integral multiple of a degree of parallelism of data transmission; and the data transmission module is communicatively connected and controlled by the processing module and is configured to take out the second to-be-processed data matrix from the first streaming lake in a preset manner for a convolution operation.

In an embodiment of the present disclosure, the step in which the invalid data is added to the starting point of the first to-be-processed data matrix specifically includes a step described below. If a value of the degree of parallelism of data transmission is set as a parameter pv, (pv−2) columns of invalid data are added to the starting point of the first to-be-processed data matrix to form pv columns of data with first two columns of valid data of the first to-be-processed data matrix.

In an embodiment of the present disclosure, the artificial intelligence convolution processing apparatus includes a second streaming lake and a matrix module. The second streaming lake is configured to: store the second to-be-processed data matrices which are taken out from the first streaming lake in batches by the data transmission module according to rows and a data size of pv*1; the matrix module is configured to: store the second to-be-processed data matrices which are taken out from the second streaming lake in batches by the data transmission module according to rows and a data size of pv*k, where k is a size of a convolution kernel matrix.

In an embodiment of the present disclosure, the artificial intelligence convolution processing apparatus includes steps described below. Each k rows of second to-be-processed data matrices are taken to be a group of data; the data transmission module sequentially performs following operations on each group of data: in each clock cycle, sequentially taking out a number pv*k of third to-be-processed data matrices from the each group of data until the each group of data is taken out entirely; the matrix module is further configured to: starting from a second third to-be-processed data matrix taken out from the each group of data by the data transmission module, combine each third to-be-processed data matrix and last 2 columns of a previous third to-be-processed data matrix are combined to form a k*(pv+2) order fourth to-be-processed data matrix, so that each fourth to-be-processed data matrix obtains a number pv of calculation result values.

In an embodiment of the present disclosure, the first streaming lake stores a plurality of first to-be-processed data matrices, each of the first to-be-processed data matrices corresponds to one channel data of multi-channel data, wherein the convolution module includes a plurality of convolution kernel matrices.

In an embodiment of the present disclosure, the plurality of convolution kernel matrices comprises a plurality of weight matrices with different weights, and the plurality of weight matrices is used for separately performing a convolution operation with the third to-be-processed data matrix at the same time.

In an embodiment of the present disclosure, the data transmission module is further configured to, according to a data size of 1*1, take out the first to-be-processed data matrix from an external storage module and place into the first streaming lake.

In order to implement the above object and other related objects, the disclosure provides a computer-readable storage medium, which is configured to store a computer program for implementing the streaming-based artificial intelligence convolution processing method when the program is executed by a processor.

In order to implement the above object and other related objects, the disclosure provides an artificial intelligence convolution processing terminal. The terminal includes a processor and a memory. The memory is configured to store a computer program, and the processor is configured to execute the computer program stored in the memory, to cause the terminal to execute the streaming-based artificial intelligence convolution processing method.

DESCRIPTION OF REFERENCE SIGNS

| | |
|---|---|
| R1~R6 | Dashed rectangle |
| D1~D3 | Pv*1 data |
| M1 | Third to-be-processed data matrix |
| M2 | Third to-be-processed data matrix |
| M3 | Third to-be-processed data matrix |
| M12 | Fourth to-be-processed data matrix |
| M23 | Fourth to-be-processed data matrix |
| L1 | Straight line |
| L2 | Straight line |
| T1 | Clock cycle |
| T2 | Clock cycle |

-continued

| | |
|---|---|
| T3 | Clock cycle |
| 50 | Programmable Logic side |
| 51 | First streaming lake |
| 52 | Second streaming lake |
| 53 | Data transmission module |
| 54 | Processing module |
| 55 | Matrix module |
| 56 | Convolution module |
| 57 | External storage module |
| S101~S102 | Step |

DETAILED DESCRIPTION

The following implementations of the present disclosure are provided through specific examples, and other advantages and effects of the present disclosure will be readily apparent to those skilled in the art from the disclosure herein. The present disclosure may also be applied or implemented through other different specific examples, and various modifications and variations may be made to the details in the specification on the basis of different opinions and applications without departing from the principle of the present disclosure. It is to be noted that if not in collision, the embodiments and features therein in the present disclosure may be combined with each other.

It should be noted that the drawings provided in the following embodiments are only for illustrating the basic idea of the present disclosure, and the drawings only show the components related to the present disclosure rather than being drawn according to the number, shape and size of the components in actual implementation, and the type, amount and scale of each component in actual implementation can be changed freely, and the layout of the components can be more complex.

Implementation Mode 1

Figure 1:
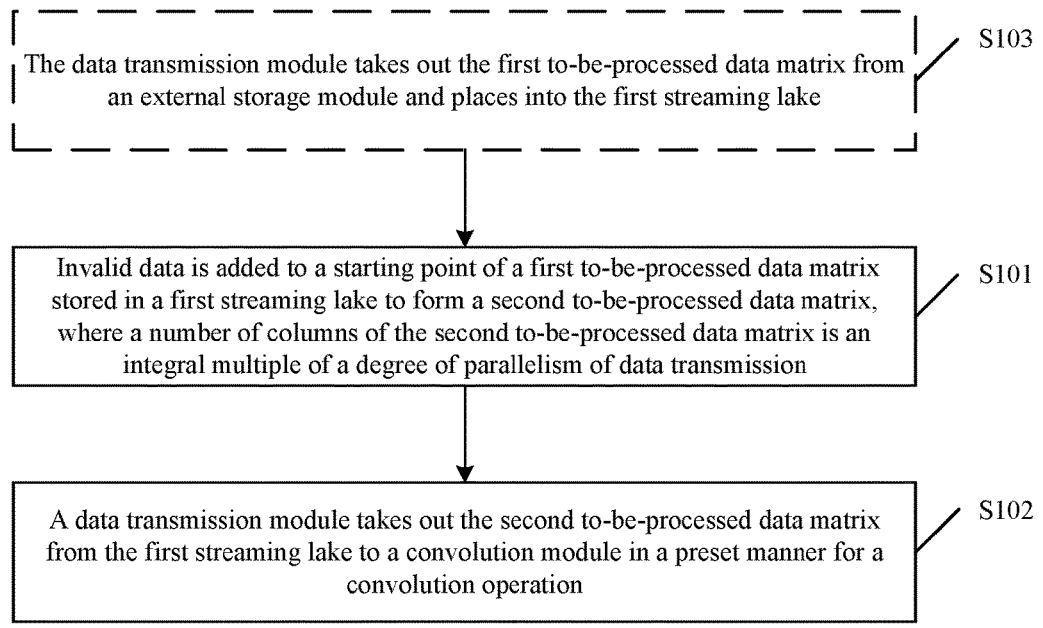
FIG. 1 is a flow chart of an artificial intelligence parallel convolution method according to an embodiment of the present disclosure.

FIG. 1 is a flow chart of a streaming-based artificial intelligence convolution processing method according to an embodiment of the present disclosure. The streaming-based artificial intelligence convolution processing method is applied to a processing module, and the processing module may be an ARM module, an MCU module, a Soc module, or the like. The streaming-based artificial intelligence convolution processing method specifically includes steps described below.

In S101, a plurality of columns of invalid data is added to a starting point of a first to-be-processed data matrix stored in a first streaming lake to form a second to-be-processed data matrix, where a number of columns of the second to-be-processed data matrix is an integral multiple of a degree of parallelism of data transmission.

The first streaming lake may be a RAM or a ROM, such as a third generation DDR SDRAM, a fourth generation DDR SDRAM, or the like. The streaming lake stores to-be-processed data, and the to-be-processed data is stored in the form of a matrix, which is referred to as a first to-be-processed data matrix in this embodiment.

In an embodiment, to-be-determined data may has image data of three channels, i.e, red (R), green (G), and blue (B), each channel corresponding to one first to-be-processed data matrix. In this case, in order to process the image data of three channels, the first streaming lake stores three first to-be-processed data matrix corresponding to three channels, respectively.

Figure 2:
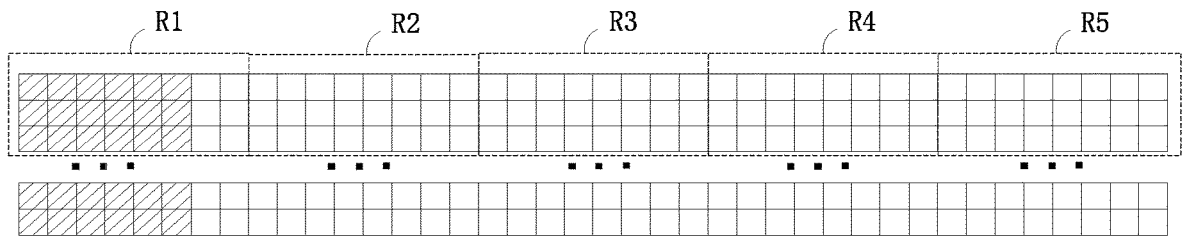
FIG. 2 is a schematic diagram of a to-be-processed data matrix according to an embodiment of the present disclosure.

FIG. 2 is a schematic diagram of a to-be-processed data matrix according to an embodiment of the present disclosure. The first to-be-processed data matrix is set as a 34*34 matrix, and a degree pv of parallelism of data transmission is set as 8. The degree pv of parallelism of data transmission represents a number of columns of the to-be-processed data transmitted by the data transmission module each time, and a value of the degree of parallelism of data transmission is related to efficiency of a streaming-based artificial intelligence convolution processing method; the data transmission module may be, for example, a DMA controller, that is, a DMA interface circuit, and the data transmission module is used for data transmission between an external memory and a Programmable Logic side. The DMA transmission is a high-speed data transmission operation that allows direct read and write operations between an external device and a memory without CPU intervention during the entire process.

The processing module adds 6 columns of invalid data to the starting point of the first to-be-processed data matrix to form a second to-be-processed data matrix of a size of 34*40, where a number of columns of the second to-be-processed data matrix is 40, and the number can be divided evenly by the degree of parallelism of data transmission. For the convenience of distinguishing, in FIG. 2, the valid data is represented by blank grids, and the added invalid data is represented by grids filled with oblique lines. It should be noted that the valid data may include zero-padding data, and the zero padding data and non-zero-padding data are collectively referred to as the valid data in the present disclosure.

In S102, a data transmission module is used to take out the second to-be-processed data matrix from the first streaming lake to a convolution module in a preset manner for a convolution operation.

The convolution module is a convolution operation circuit, and may be formed by connecting a multiplier and an adder. In an embodiment, the convolution module includes one convolution kernel matrix. In another embodiment, the convolution module includes multiple convolution kernel matrices with different weights. For example, the image data has three channels, i.e., R, G and B. Therefore, there are 3 convolution kernel matrices. The size of each convolution kernel matrix may be set to 3*3. In addition, it is assumed that the data transmission module takes out the channel data according to a data size of 8*3*3 matrix, that is, the data transmission module takes out eight 3*3 matrices at a time.

If the three two-dimensional matrices, R, G and B, are not subject to a parallel convolution operation, the operation can be completed through successive three times of calculation, which is time-consuming and inefficient. In the present disclosure, the convolution between the three two-dimensional matrices, R, G, and B, and the eight 3*3 matrices is performed in parallel, so that each set of eight 3*3 matrices has 8*3 convolution result values. In the present disclosure, it is not needed to wait for a convolution operation of a convolution kernel matrix to finish before performing a convolution operation of a next convolution kernel matrix, and the parallel convolution operation is implemented through a hardware device such as a convolution operation circuit and the like, and especially in a condition of a large amount of data calculation, the convolution operation efficiency is greatly enhanced compared with calculation through software. Therefore, the present disclosure greatly improves the degree of parallelism of the processing and the calculation efficiency through the artificial intelligence parallel processing method.

Specifically, according to rows and a data size of pv*1, the data transmission module takes out the second to-be-processed data matrix from the first streaming lake and places into a second streaming lake in batches. A schematic diagram of the transmission module taking out the second to-be-processed data matrix is described below with reference to specific diagrams.

Figure 3:
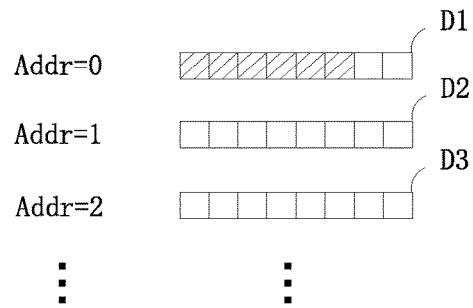
FIG. 3 is a schematic diagram of a data transmission module taking out to-be-processed data according to an embodiment of the present disclosure.

FIG. 3 is a schematic diagram of the data transmission module taking out to-be-processed data according to an embodiment of the present disclosure. Starting from a leftmost side of a first row of the to-be processed data, the data transmission module takes out a number pv*1 of data each time until the to-be processed data in the first row are all taken out. Based on a same principle, the data transmission module continues to take a second row, a third row, and so on, until the second to-be processed data matrix is taken out entirely.

Specifically, taking the first row as an example, first pv*1 data includes six invalid data and two valid data, and starting from second pv*2 data, each pv*1 data includes eight valid data. The data transmission module takes out first pv*1 data D1 and then places the data D1 into a position where an address Addr equals to zero in the second streaming lake, takes out second pv*1 data D2 and then places the data D2 into a position where an address Addr equals to one, takes out third pv*1 data D3 and then places the data D3 into a position where an address Addr equals to two, and so on; the entire second to-be-processed data matrix is taken out from the first streaming lake and then placed into the second streaming lake.

After the data transmission module stores the second to-be-processed data matrix into the second streaming lake, the second to-be-processed data matrix is taken out from the second streaming lake in batches according to rows and the data size of pv*k, and is placed into a matrix module for data combination, where k is a size of a convolution kernel matrix, and the convolution kernel matrix is a weight matrix for convolution calculation; the convolution kernel matrix may be set as an odd-order matrix, and in this embodiment, the convolution kernel matrix is set as a 3*3 matrix.

As shown in FIG. 2, the data transmission module sequentially takes out a 3*8 third to-be-processed data matrix from first three rows of the 34*40 second to-be-processed data matrix from left to right in each clock cycle. That is, five 3*8 third to-be-processed data matrices may be taken out from the first three rows. Based on the same principle, the data transmission module continues to take out the to-be-processed data in subsequent rows after taking out data in the first three rows. For the convenience of those skilled in the art to understand, the third to-be-processed data in the first three rows are represented by dashed rectangles R1 to R5 in FIG. 2.

Figure 4:
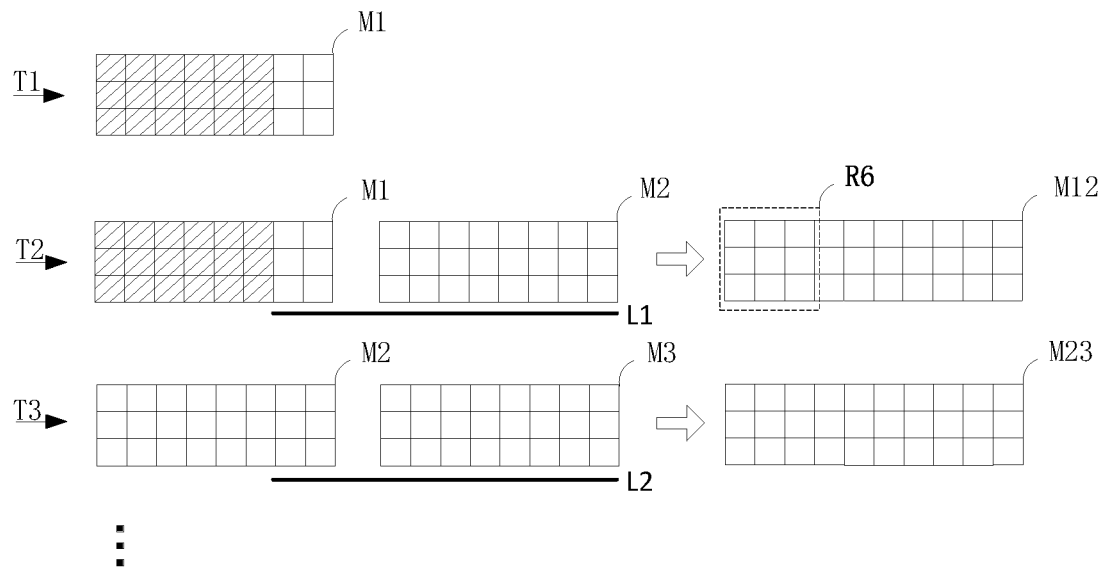
FIG. 4 is a schematic diagram of a data transmission module taking out to-be-processed data according to an embodiment of the present disclosure.

FIG. 4 is a schematic diagram of the data transmission module taking out to-be-processed data according to an embodiment of the present disclosure. In a first clock cycle T1, a first third to-be-processed data matrix M1 taken out by the data transmission module includes 6 columns of invalid data and 2 columns of valid data, and a convolution result of the third to-be-processed data matrix M1 is an invalid value.

In a second clock cycle T2, the data transmission module takes out a second third to-be-processed data matrix M2, the second third to-be-processed data matrix M2 and last two columns of the first third to-be-processed data matrix M1 are combined to form a 3*10 fourth to-be-processed data matrix M12, where the combined to-be-processed data is represented by a straight line L1 in the drawing. The data matrix M2 and the last two columns of the data matrix M1 are combined to obtain a ten-column data matrix M12. Matrix extraction may be performed on the 3*10 fourth to-be-processed data matrix M12 according to a step length of 1 to obtain eight 3*3 fifth to-be-processed data matrices; and the eight 3*3 fifth to-be-processed data matrices are transmitted to a convolution module to perform convolution calculation with the 3*3 convolution kernel matrix and obtain 8 calculation result values. In an embodiment, for the to-be-processed data including the image data with three channels, the convolution calculation is performed between the eight 3*3 fifth to-be-processed data matrices and the three 3*3 convolution kernel matrix, and 3*8 calculation result values are obtained.

Specifically, the eight 3*3 fifth to-be-processed data matrices specifically refer to: from a starting position being a matrix covered by a dashed rectangle R6 in FIG. 4, the dashed rectangle R6 in FIG. 4 moves toward the right column by column according to a step length of 1, and a matrix with a size of 3*3 is obtained after each movement. It can be seen that the dashed rectangle R6 will move in the 3*10 matrix M12 for 7 times in total, therefore a total number 8 of 3*3 matrices are obtained, that is, a number pv of k*k matrices.

Similarly, in a third clock cycle T3, the data transmission module takes out a third third to-be-processed data matrix M3, the third third to-be-processed data matrix M3 and last two columns of the second third to-be-processed data matrix M2 are combined to from a 3*10 fourth to-be-processed data matrix M23, where the combined to-be-processed data is represented by a straight line L2 in the drawing. The data matrix M3 and the last two columns of the data matrix M2 are combined to obtain a ten-column data matrix M23. Matrix extraction may be performed on the 3*10 fourth to-be-processed data matrix M23 according to a step length of 1 to obtain eight 3*3 fifth to-be-processed data matrices; and the eight 3*3 fifth to-be-processed data matrices are transmitted to a convolution module for convolution calculation with the 3*3 convolution kernel matrix, and 8 calculation result values are obtained. In an embodiment, for the to-be-processed data including the image data with three channels, the convolution calculation is performed between the eight 3*3 fifth to-be-processed data matrices and the three 3*3 convolution kernel matrix, and 3*8 calculation result values are obtained. By that analogy, the data transmission module will complete data processing of the entire second to-be-processed data matrix after a plurality of clock cycles based on the same principle.

In an embodiment, before S101, the streaming-based artificial intelligence convolution processing method further includes a step below.

In S103, the data transmission module takes out the first to-be-processed data matrix from an external storage module and places into the first streaming lake.

In an embodiment, the data transmission module takes out the first to-be-processed data matrix from an external storage module and places into the first streaming lake according to a data size of 1*1.

It should be noted that, if no invalid data is added to the 34*40 second to-be-processed data matrix, six 3*3 matrices may be extracted from the read-in first 3*8 third to-be-processed data matrix for convolution, and six calculation result values are output. However, starting from a second 3*8 third to-be-processed data matrix, a 3*8 third to-be-processed data matrix and last two columns of a previous third to-be-processed data matrix may be combined to from a 3*10 matrix, so that eight 3*3 matrices are sequentially extracted for convolution and eight calculation result values are output. Therefore, in the case of no invalid data added, the convolution between the entire second to-be-processed data matrix and the 3*3 convolution kernel matrix will obtain following continuously cyclic convolution results: six convolution calculation result values, eight convolution calculation result values, eight convolution calculation result values, and so on; since numbers of the convolution result values are not uniform, pipeline processing of artificial intelligence convolution cannot be implemented, thereby greatly reducing efficiency of convolution calculation.

In the streaming-based artificial intelligence convolution processing method provided by the present disclosure, a result obtained through convolution calculation performed by the first three rows of the 34*40 second to-be-processed data matrix of and the 3*3 convolution kernel matrix is: an invalid value, eight convolution calculation result values, eight convolution calculation result values, eight convolution calculation result values, and eight convolution calculation result values. By that analogy, the convolution calculation between the entire 34*40 second to-be-processed data matrix and the 3*3 convolution kernel matrix will obtain following continuously cyclic convolution results: an invalid value, eight convolution calculation result values, eight convolution calculation result values, and so on. Therefore, in the streaming-based artificial intelligence convolution processing method provided by the present disclosure, the number of output convolution calculation result values is unified to pv, so that the pipeline processing of artificial intelligence convolution can be implemented, thereby greatly enhancing the operating efficiency of artificial intelligence convolution calculation and greatly improving convolution calculation performance.

Figure 5:
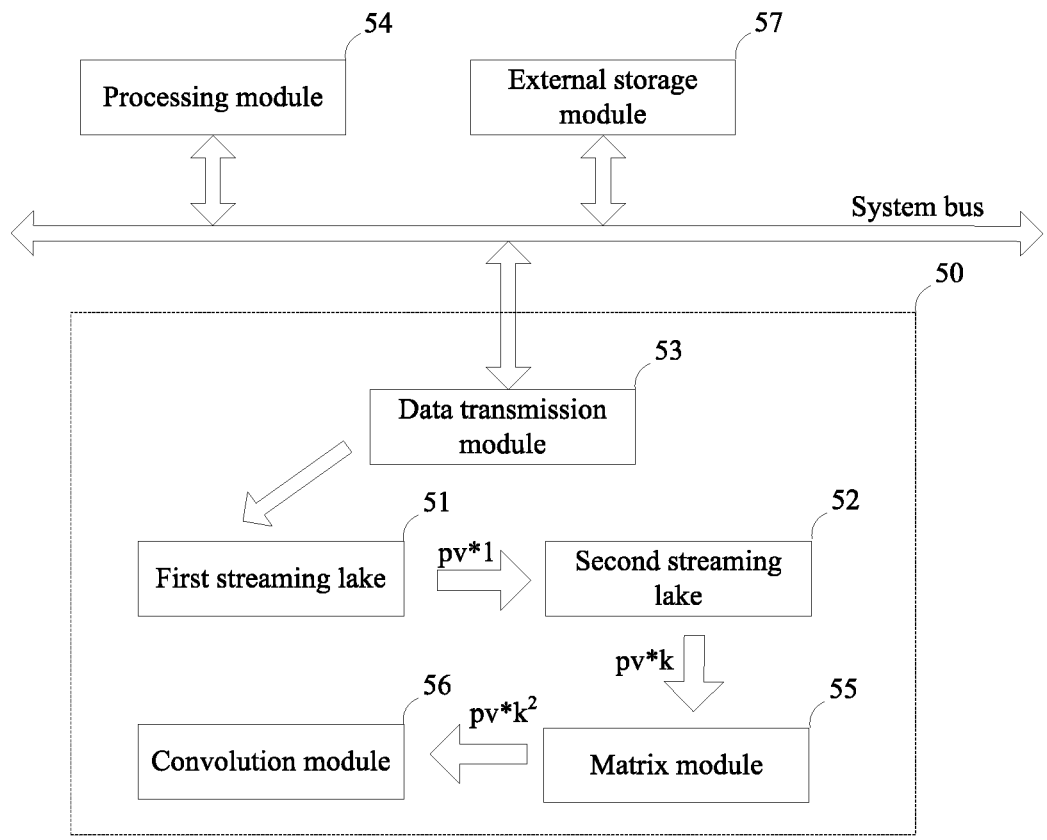
FIG. 5 is a schematic diagram of an artificial intelligence convolution processing apparatus according to an embodiment of the present disclosure.

As shown in FIG. 5, an artificial intelligence convolution processing apparatus according to an embodiment of the present disclosure includes a first streaming lake 51, a second streaming lake 52, a data transmission module 53, a processing module 54, and a matrix module 55. The first streaming lake 51, the second streaming lake 52, the data transmission module 53, the matrix module 55 and a convolution module 56 are commonly disposed at a Programmable Logic side 50 of a FPGA, which is also commonly referred to as PL side.

The data transmission module is specifically used for transmitting to-be-processed data from an external storage module 57 to the first streaming lake 51 through a system bus according to a data size of 1*1, then taking out the to-be-processed data from the first streaming lake 51 and transmitting the to-be-processed data to the second streaming lake 52 according to a data size of pv*1, then taking out the to-be-processed data from the second streaming lake 52 and transmitting the to-be-processed data to the matrix module according to a data size of pv*k for data combination, and then taking out the to-be-processed data from the matrix module and transmitting the to-be-processed data to the convolution operation module 56 according to a data size of pv*k*k.

The convolution module 56 includes one or more convolution kernel matrices. In an embodiment, the convolution module 56 includes multiple convolution kernel matrices for a parallel convolution operation. The convolution kernel matrices specifically are: convolution kernel matrix 1, convolution kernel matrix 2, . . . , convolution kernel matrix n.

The first streaming lake 51 stores a first to-be-processed data matrix, and the first to-be-processed data matrix is taken out from an external storage module 57 by the data transmission module 53 through a system bus. The external storage module 57 is, for example, a DDR memory.

The processing module 54 is used for adding a plurality of columns of invalid data to the starting point of the first to-be-processed data matrix to form a second to-be-processed data matrix; a number of columns of the second to-be-processed data matrix is an integral multiple of a degree of parallelism of data transmission; the data transmission module 53 is communicatively connected and controlled by the processing module 54, and is configured to take out the second to-be-processed data matrix from the first streaming lake 51 for a convolution operation.

The first streaming lake 51 may be, for example, a BRAM memory, that is, a Block RAM, which is a RAM storage resource of an FPGA (Field Programmable Gate Array). The processing module 54 may be, for example, an ARM module, an MCU module, a Soc module, or the like.

Implementation Mode 2

Figure 6:
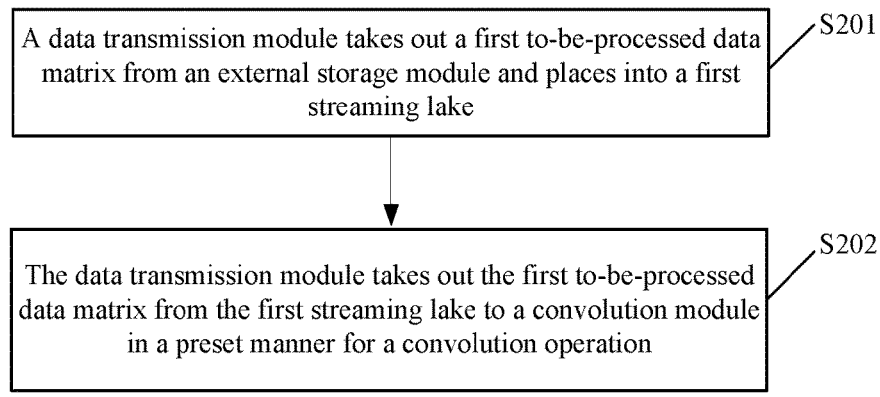
FIG. 6 is a flow chart of another artificial intelligence parallel convolution method according to an embodiment of the present disclosure.
Figure 7:
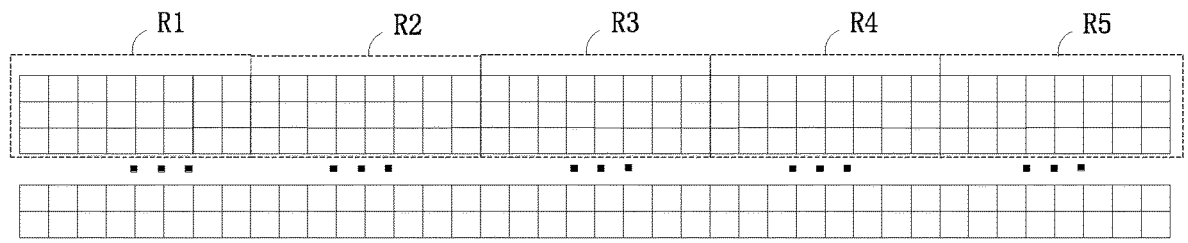
FIG. 7 is a schematic diagram of another to-be-processed data matrix according to an embodiment of the present disclosure.

FIG. 6 is a flow chart of another artificial intelligence parallel convolution method according to an embodiment of the present disclosure. FIG. 7 is a schematic diagram of another to-be-processed data matrix according to an embodiment of the present disclosure.

As shown in FIG. 7, in this implementation, the to-be-processed data matrix is set to have a size of 34*40, and the degree of parallelism pv of data transmission is set to be 8.

Compared with the implementation mode 1 in which multiple columns of invalid data are added to a first to-be-processed data matrix of a size of 34*34 stored in the first streaming lake to form a second to-be-processed data matrix of a size of 34*40, in the implementation mode 2, the first to-be-processed data matrix itself is a 34*40 matrix. Therefore, it is unnecessary to add invalid data to the front end of the first to-be-processed data matrix. The data transmission module takes out the first to-be-processed data matrix of the size of 34*40 from the first streaming lake to the second streaming lake according to a data size of pv*1.

Accordingly, as shown in FIG. 6, the artificial intelligence parallel convolution method includes steps described below.

In S201, A data transmission module takes out a first to-be-processed data matrix from an external storage module and places into a first streaming lake.

In S202, The data transmission module takes out the first to-be-processed data matrix from the first streaming lake to a convolution module in a preset manner for a convolution operation.

As shown in FIG. 7, since the degree pv of parallelism of data transmission is set to 8 and the first to-be-processed data matrix is a 34*40 matrix, the data transmission module takes out the 34*40 matrix from the first streaming lake to the second streaming lake according to a 8*1 data size.

Figure 8:
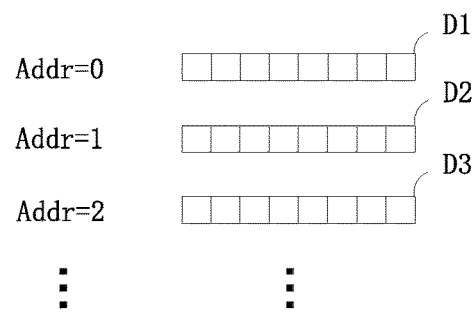
FIG. 8 is a schematic diagram of the data transmission module taking out the to-be-processed data according to an embodiment of the present disclosure.

FIG. 8 is a schematic diagram of the data transmission module taking out the to-be-processed data according to an embodiment of the present disclosure. Starting from a leftmost side of a first row of the first to-be processed data matrix, the data transmission module takes out 8*1 data each time until the-to-be processed data in the first row are all taken out. Based on a same principle, the data transmission module continues to take a second row, a third row, and so on, until the 34*40 matrix is taken out entirely.

Figure 9:
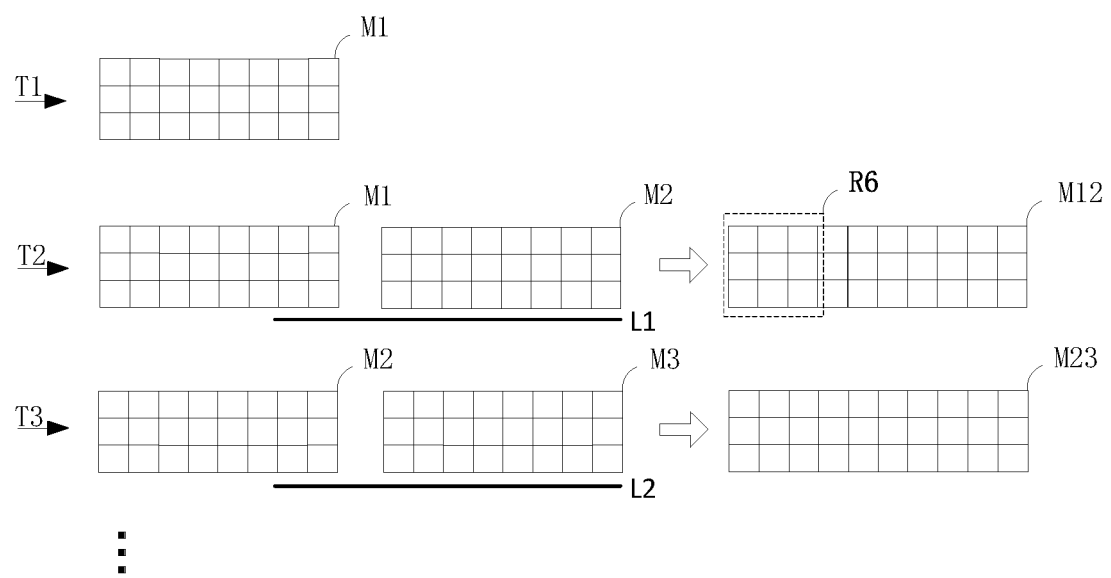
FIG. 9 is a schematic diagram of the data transmission module taking out the to-be-processed data according to an embodiment of the present disclosure.

FIG. 9 is a schematic diagram of the data transmission module taking out the to-be-processed data according to an embodiment of the present disclosure.

In a first clock cycle T1, the data transmission module takes out a first 8*3 third to-be-processed data matrix M1 from the second streaming lake. Since a first 8*3 third to-be-processed data matrix taken out in each row can only obtain less than 8 convolution result values through the convolution operation, the first 8*3 third to-be-processed data matrix taken out in each row is set as invalid data, that is, the convolution result values of the 8*3 matrix M1 are invalid values.

In a second clock cycle T2, the data transmission module takes out a second 8*3 third to-be-processed data matrix M2, the 8*3 third to-be-processed data matrix M2 and last two columns of the 8*3 third to-be-processed data matrix M1 are combined to form a 10*3 fourth to-be-processed data matrix M12, where the combined matrix data is represented by a straight line L1 in the drawing. Matrix extraction may be performed on the 10*3 fourth to-be-processed data matrix M12 according to a step length of 1 to obtain eight 3*3 fifth to-be-processed data matrices; and the eight 3*3 fifth to-be-processed data matrices are transmitted to the convolution operation module to perform convolution calculation with the 3*3 convolution kernel matrix and obtain 8 calculation result values.

Similarly, in a third clock cycle T3, the data transmission module takes out a third 8*3 third to-be-processed data matrix M3, the 8*3 third to-be-processed data matrix M3 and last two columns of the 8*3 third to-be-processed data matrix M2 are combined to form a 10*3 fourth to-be-processed data matrix M23, where the combined matrix data is represented by a straight line L2 in the drawing. The third to-be-processed data matrix M3 and the last two columns of the third to-be-processed data matrix M2 are combined to obtain a ten-column fourth to-be-processed data matrix M23. Matrix extraction may be performed on the 10*3 fourth to-be-processed data matrix M23 according to a step length of 1 to obtain eight 3*3 fifth to-be-processed data matrices; and the eight 3*3 fifth to-be-processed data matrices are transmitted to the convolution operation module to perform convolution calculation with the 3*3 convolution kernel matrix and obtain 8 calculation result values.

Other details in the implementation mode 2 are substantially the same as those of the implementation mode 1, and will not be described here.

The implementation of the artificial intelligence convolution processing apparatus is similar to the implementation of the streaming-based artificial intelligence convolution processing method, and will not be described here. Those skilled in the art should be able to understand the principle and implementation of the artificial intelligence convolution processing apparatus based on the streaming-based artificial intelligence convolution processing method.

Those skilled in the art can understand that all or part of the steps of implementing the above-described embodiments may be completed by a computer program with associated hardware. The above-mentioned computer program may be stored in a computer-readable storage medium. When executed, the program performs steps including the embodiments described above; and the storage medium mentioned above includes a ROM, a RAM, a magnetic disk, an optical disks or another medium capable of storing program codes.

The disclosure further provides an artificial intelligence convolution processing terminal. The terminal includes a processor and a memory. The memory is configured to store a computer program, and the processor is configured to execute the computer program stored in the memory, to cause the terminal to execute the streaming-based artificial intelligence convolution processing method.

The memory may include a Random Access Memory (RAM), and may further include a non-volatile memory, such as at least one disk memory.

The processor may be a general-purpose processor, including a Central Processing Unit (CPU), a Network Processor (NP), and the like; the processor may also be a Digital Signal Processing (DSP), an Application Specific Integrated Circuit (ASIC), a Field-Programmable Gate Array (FPGA) or other programmable logic devices, a discrete gate or transistor logic device, or a discrete hardware component.

As described above, in the streaming-based artificial intelligence convolution processing method and apparatus, the readable storage medium, and the terminal provided by the present disclosure, a plurality of columns of invalid data are added to the to-be-processed data matrix, so that a number of columns of the matrix after the invalid data is added is a multiple of the degree of parallelism of data transmission, and thus the number of output convolution calculation result values is unified as pv, the pipeline processing of artificial intelligence convolution can be implemented, the operating efficiency of the artificial intelligence convolution calculation is greatly enhanced, and the convolution calculation performance is greatly improved. Therefore, the present disclosure effectively overcomes various shortcomings in the related art and has a high industrial utilization value.

The above embodiments are only used to illustrate the principle and effect of the present disclosure, and are not intended to limit the present disclosure. Anyone skilled in this art can modify or change the above embodiments without departing from the spirit and scope of the present disclosure. Therefore, all equivalent modifications or changes made by those with ordinary knowledge in this art without departing from the spirit and technical idea disclosed by the present disclosure should still be covered by the claims of the present disclosure.

What is claimed is:

1. A streaming-based artificial intelligence convolution processing method, applied to a processing module, comprising:
    adding invalid data to a starting point of a first to-be-processed data matrix stored in a first streaming lake to form a second to-be-processed data matrix, wherein a number of columns of the second to-be-processed data matrix is an integral multiple of a degree of parallelism of data transmission; and
    using a data transmission module to take out the second to-be-processed data matrix from the first streaming lake to a convolution module in a preset manner for a convolution operation.

2. The streaming-based artificial intelligence convolution processing method of claim 1, wherein the degree of parallelism of data transmission is set to be pv,
    wherein adding the invalid data to the starting point of the first to-be-processed data matrix stored in the first streaming lake to form the second to-be-processed data matrix specifically comprises:
        adding (pv−2) columns of invalid data to the starting point of the first to-be-processed data matrix to form pv columns of data with first two columns of valid data of the first to-be-processed data matrix.

3. The streaming-based artificial intelligence convolution processing method of claim 2, wherein using the data transmission module to take out the second to-be-processed data matrix from the first streaming lake to the convolution module in the preset manner for the convolution operation comprising:
    according to rows and a data size of pv*l, using the data transmission module to take out the second to-be-processed data matrix from the first streaming lake and place into a second streaming lake in batches;
    according to rows and a data size of pv*k, using the data transmission module to take out the second to-be-processed data matrix from the second streaming lake and place into a matrix module in batches for data combination, wherein k is a size of a convolution kernel matrix; and according to a data size of pv*k*k, using the data transmission module to take out the second to-be-processed data matrix after the data combination and place into the convolution module.

4. The streaming-based artificial intelligence convolution processing method of claim 3, wherein according to the rows and the data size of pv*k, using the data transmission module to take out the second to-be-processed data matrix from the second streaming lake and placing into the matrix module in batches for data combination specifically comprising:

taking each k rows of second to-be-processed data matrices to be a group of data; and using the data transmission module to sequentially perform a following operation on each group of data: in each clock cycle, sequentially taking out a third to-be-processed data matrix with the data size of pv*k from the each group of data and placing into the matrix module until the each group of data is taken out entirely.

5. The streaming-based artificial intelligence convolution processing method of claim 4, wherein in the each group of data, a first third to-be-processed data matrix with the data size of pv*k taken out by the data transmission module comprises (pv−2) columns of invalid data and 2 columns of valid data, so that a calculation result value is an invalid value, and starting from a second third to-be-processed data matrix taken out by the data transmission module, each third to-be-processed data matrix and last 2 columns of a previous third to-be-processed data matrix are combined to form a k*(pv+2) order fourth to-be-processed data matrix, each k*(pv+2) order fourth to-be-processed data matrix can perform matrix extraction according to a step length of 1 to obtain a number pv of k*k order fifth to-be-processed data matrices, and the k*k order fifth to-be-processed data matrices are transmitted to a convolution module for convolution calculation with the convolution kernel matrix.

6. The streaming-based artificial intelligence convolution processing method of claim 5, wherein the first streaming lake stores a plurality of first to-be-processed data matrices, each of the first to-be-processed data matrices corresponds to one channel data of multi-channel data, wherein the convolution module includes a plurality of convolution kernel matrices.

7. The streaming-based artificial intelligence convolution processing method of claim 6, wherein the plurality of convolution kernel matrices comprises a plurality of weight matrices with different weights, and the plurality of weight matrices is used for separately performing a convolution operation with the third to-be-processed data matrix at the same time.

8. The streaming-based artificial intelligence convolution processing method of claim 5, further comprising:

according to a data size of 1*1, using the data transmission module to take out the first to-be-processed data matrix from an external storage module and place into the first streaming lake.

9. A non-transitory computer-readable storage medium, which is configured to store a computer program for implementing the streaming-based artificial intelligence convolution processing method of claim 1 when the program is executed by a processor.

10. An streaming-based artificial intelligence convolution processing terminal comprising: a processor and a memory, wherein the memory is configured to store a computer program and the processor is configured to execute the computer program stored so that the terminal executes the streaming-based artificial intelligence convolution processing method of claim 1.

11. A streaming-based artificial intelligence convolution processing apparatus comprising:

a first streaming lake, storing a first to-be-processed data matrix;

a processing module, which is configured to add invalid data to a starting point of a first to-be-processed data matrix to form a second to-be-processed data matrix, wherein a number of columns of the second to-be-processed data matrix is an integral multiple of a degree of parallelism of data transmission; and a data transmission module, which is communicatively connected and controlled by the processing module and is configured to take out the second to-be-processed data matrix from the first streaming lake to a convolution module in a preset manner for a convolution operation.

12. The streaming-based artificial intelligence convolution processing apparatus of claim 11, wherein adding the plurality of columns of invalid data to the starting point of the first to-be-processed data matrix comprising:

setting a value of the degree of parallelism of data transmission as pv, adding, by the processing module, (pv−2) columns of invalid data to the starting point of the first to-be-processed data matrix to form pv columns of data with first two columns of valid data of the first to-be-processed data matrix.

13. The streaming-based artificial intelligence convolution processing apparatus of claim 12 comprising:

a second streaming lake, which is configured to store the second to-be-processed data matrix from the first streaming lake; and a matrix module, which is configured to store the second to-be-processed data matrix from the second streaming lake.

14. The streaming-based artificial intelligence convolution processing apparatus of claim 13, wherein each k rows of second to-be-processed data matrices is taken to be a group of data; and the data transmission module sequentially performs following operations on each group of data: in each clock cycle, sequentially taking out a number pv*k of third to-be-processed data matrices from the each group of data until the each group of data is taken out entirely;

wherein the matrix module is further configured to: starting from a second third to-be-processed data matrix taken out from the each group of data by the data transmission module, combine each third to-be-processed data matrix and last 2 columns of a previous third to-be-processed data matrix are combined to form a k*(pv+2) order fourth to-be-processed data matrix; and wherein each k*(pv+2) order fourth to-be-processed data matrix can perform matrix extraction according to a step length of 1 to obtain a number pv of k*k order fifth to-be-processed data matrices, and the k*k order fifth to-be-processed data matrices are transmitted to a convolution module to perform convolution calculation with the convolution kernel matrix.

15. The streaming-based artificial intelligence convolution processing apparatus of claim 14, wherein the first streaming lake stores a plurality of first to-be-processed data matrices, each of the first to-be-processed data matrices corresponds to one channel data of multi-channel data, wherein the convolution module includes a plurality of convolution kernel matrices.

16. The streaming-based artificial intelligence convolution processing apparatus of claim 15, wherein the plurality of convolution kernel matrices comprises a plurality of weight matrices with different weights, and the plurality of weight matrices is used for separately performing a convolution operation with the third to-be-processed data matrix at the same time.

17. The streaming-based artificial intelligence convolution processing apparatus of claim 11, wherein the data transmission module is further configured to:
    according to a data size of 1*1, take out the first to-be-processed data matrix from an external storage module and place into the first streaming lake.

* * * * *